(12) United States Patent
Ishibashi et al.

(10) Patent No.: US 7,926,513 B2
(45) Date of Patent: Apr. 19, 2011

(54) SPOOL VALVE

(75) Inventors: Ryo Ishibashi, Kariya (JP); Motoyoshi Andoh, Nagoya (JP)

(73) Assignee: Denso Corporation, Kariya (JP)

( * ) Notice: Subject to any disclaimer, the term of this patent is extended or adjusted under 35 U.S.C. 154(b) by 783 days.

(21) Appl. No.: 11/902,359

(22) Filed: Sep. 20, 2007

(65) Prior Publication Data

US 2008/0072978 A1 Mar. 27, 2008

(30) Foreign Application Priority Data

Sep. 21, 2006 (JP) .................................. 2006-256128

(51) Int. Cl.
*F16K 11/07* (2006.01)
(52) U.S. Cl. ..................................... 137/625.68; 251/50
(58) Field of Classification Search ............. 137/625.69, 137/625.68, 625.65; 251/50
See application file for complete search history.

(56) References Cited

U.S. PATENT DOCUMENTS

| 3,176,721 | A | * | 4/1965 | Gordon | ..................... | 137/625.68 |
| 3,266,522 | A | * | 8/1966 | Gordon | ..................... | 137/625.69 |
| 5,533,551 | A | * | 7/1996 | Grancher | ................. | 137/625.62 |
| 7,066,206 | B2 | | 6/2006 | Ino et al. | | |
| 7,104,283 | B2 | | 9/2006 | Ino et al. | | |
| 2002/0134443 | A1 | * | 9/2002 | Sudani et al. | ............ | 137/625.65 |
| 2006/0081298 | A1 | | 4/2006 | Segi et al. | | |

FOREIGN PATENT DOCUMENTS

| JP | 55-2828 | 1/1980 |
| JP | 2002-130515 | 2/2002 |
| JP | 2003-56515 | 2/2003 |
| JP | 2005-325891 | 11/2005 |
| JP | 2006-46640 | 2/2006 |
| JP | 2006-112514 | 4/2006 |

OTHER PUBLICATIONS

Japanese Office Action dated Nov. 9, 2010, issued in corresponding Japanese Application No. 2006- 256128 with English Translation.

* cited by examiner

*Primary Examiner* — Craig M Schneider
(74) *Attorney, Agent, or Firm* — Nixon & Vanderhye PC

(57) ABSTRACT

A spool valve includes a valve housing, a spool and radial damper device. The valve housing has a shaft bore. The spool is slidably supported within the shaft bore in a longitudinal direction, and the spool has a first diameter portion and a second diameter portion. The radial damper device has a radial damper chamber and a radial chamber restrictor. The radial damper chamber is defined by a diameter difference between the first diameter portion and the second diameter portion. The radial chamber restrictor provides communication between the radial damper chamber and an adjacent chamber disposed adjacent to the radial damper chamber in the longitudinal direction.

9 Claims, 6 Drawing Sheets

SPOOL VALVE

CROSS REFERENCE TO RELATED APPLICATION

This application is based on and incorporates herein by reference Japanese Patent Application No. 2006-256128 filed on Sep. 21, 2006.

BACKGROUND OF THE INVENTION

1. Field of the Invention

The present invention generally relates to a spool valve having a spool that slides within a valve housing in a longitudinal direction. For example, the present invention relates to damper means that damps vibration of the spool in the longitudinal direction. The present invention, for example, relates to an art used in a hydraulic control valve of an automatic transmission, and the like.

2. Description of Related Art

As an example of a related spool valve, which provides a damper function for a spool, JP-A-2006-112514 describes an solenoid operated hydraulic control valve carried in an automatic transmission.

The solenoid operated hydraulic control valve of JP-A-2006-112514, is of the kind shown, for example, in FIG. 6. That is, a spring chamber restrictor J3 with a small passage area is formed in a drain port or similar external communication passage that provides communication between a spring chamber J2, where a return spring J1 is provided, and an exterior (low pressure side) such that vibration of a spool J4 in a longitudinal direction is controlled (limited).

Typically, the solenoid operated hydraulic control valve is made by combining a spool valve J5 and a solenoid J6. The resulting valve controls a longitudinal position of the spool J4 by driving the solenoid J6 with a drive signal having a controlled duty cycle. As a result, the output oil pressure of the spool valve J5 is controlled.

In recent years, the need for improved response of a gear change of an automatic transmission has increased.

When conventional solenoid operated hydraulic control valve directly drives the spool valve J5 by the solenoid J6, disadvantages are apparent. For example, when the output of the solenoid J6 is increased in order to improve a response, the corresponding increase in the vibration of the spool J4 resulting from the duty cycle frequency applied to the solenoid J6 has a disadvantageous effect.

Thus, it is desired to raise a damper effect by combining new damper means to the existing damper means (spring chamber damper means) of the spring chamber J2 and the spring chamber restrictor J3.

That is, development of new damper means different from the existing damper means is desired.

It should further be noted that the spring chamber J2 communicates with the exterior or low pressure side via the spring chamber restrictor J3 as above.

As shown in FIG. 7A, in a first case, where an oil level L of the exterior (low pressure side) is higher than (above) the spring chamber J2, and also in another case, where the spring chamber restrictor J3 is formed in an upper end of the spring chamber J2, an interior of the spring chamber J2 becomes filled with oil.

However, in other structures, for example, as shown in FIG. 7B, due to an oil passage layout, the oil level L of the exterior (low pressure side) may be lower than (below) the upper end of the spring chamber J2 (e.g., the oil level L is positioned at intermediate part of the spring chamber J2 in an up-down direction), or, the spring chamber restrictor J3 may be located lower than the upper end of the spring chamber J2 such that the oil level L is positioned at the intermediate part of the spring chamber J2 in the up-down direction. In these cases, an air pocket, where air that enters at the time of assembly may be captured, is formed in the spring chamber J2 located higher than the spring chamber restrictor J3.

Because the spring chamber J2 is a chamber, which receives the return spring J1, the spring chamber J2 has a substantially large volume. Therefore, when air is captured in the spring chamber J2, the volume of the air pocket will also become large. Thus, when the air pocket having the large volume is formed in the spring chamber J2, air compression takes place within the spring chamber J2. Therefore, the damping effect of the spool J4 may become disadvantageously degraded.

SUMMARY OF THE INVENTION

The present invention is made in view of the above disadvantages. Thus, it is an objective of the present invention to address at least one of the above disadvantages.

To achieve the objective of the present invention, there is provided a spool valve, which includes a valve housing, a spool and radial damper means. The valve housing has a shaft bore. The spool is slidably supported within the shaft bore in a longitudinal direction, and the spool has a first diameter portion and a second diameter portion. The radial damper means has a radial damper chamber and a radial chamber restrictor. The radial damper chamber is defined by a diameter difference between the first diameter portion and the second diameter portion. The radial chamber restrictor provides communication between the radial damper chamber and an adjacent chamber disposed adjacent to the radial damper chamber in the longitudinal direction.

To achieve the objective of the present invention, there is also provided a valve having a valve housing, the valve including a bore, a spool, and a radial damper. The spool is slidably supported within the bore in a longitudinal direction, the spool having a first diameter portion and a second diameter portion. The radial damper is coupled to the spool and limiting a high frequency vibration of the spool associated with a duty frequency of a duty cycle control signal. A radial damper chamber of the radial damper is defined by a diameter difference between the first diameter portion and the second diameter portion.

To achieve the objective of the present invention, there is also provided a damper in a spool valve having a spool slidably supported in a longitudinal direction within a shaft bore of a housing, the spool having a first diameter portion and a second diameter portion, the damper including a radial damper chamber and a radial chamber restrictor. The radial damper chamber is defined by a diameter difference between the first diameter portion and the second diameter portion. The radial chamber restrictor communicates between the radial damper chamber and an adjacent chamber disposed adjacent to the radial damper chamber in the longitudinal direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
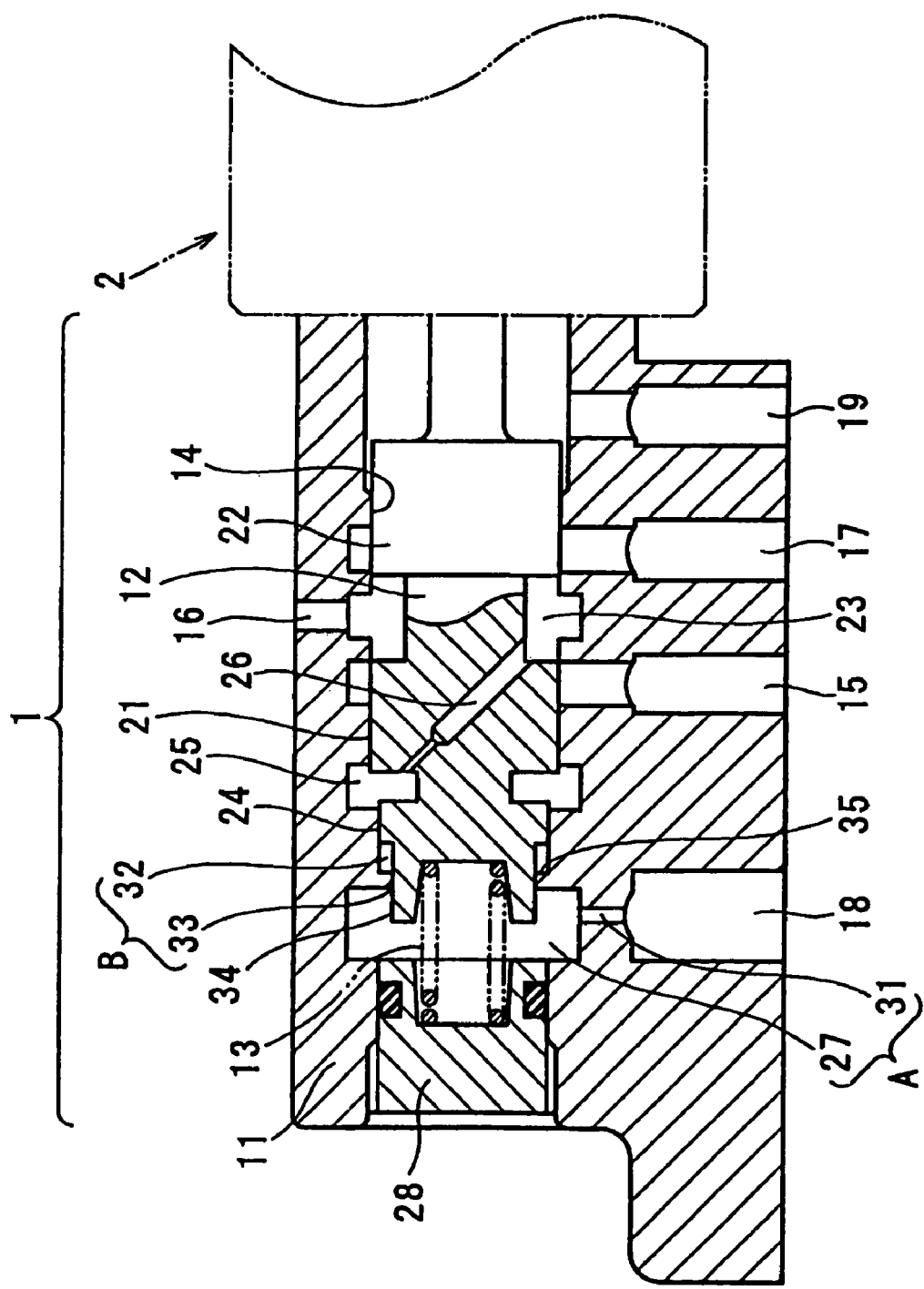
FIG. 1 is a diagram illustrating a sectional view of a solenoid operated hydraulic control valve according to a first embodiment.

The first embodiment, in which the present invention is applied to a solenoid operated hydraulic control valve mounted on a hydraulic control apparatus of an automatic transmission, is described with reference to FIG. 1.

First, a main section of the hydraulic control apparatus is explained.

An automatic transmission changes an output rotation ratio and a rotational direction of an engine, which generates power for a vehicle travel. Also, for some vehicle types, the automatic transmission locks a torque converter and changes a drive mode between a two-wheel drive mode and a four-wheel drive mode. In order to perform the above described functions, two or more friction engaging devices (a hydraulic clutch, an oil brake, and the like) are mounted on the automatic transmission. Also, the hydraulic control apparatus is mounted on the automatic transmission for controlling the engagement and disengagement of each friction engaging device according to a vehicle travel condition including a driving state of an occupant.

Each friction engaging device includes friction engagement part (e.g., multiple discs) and a hydraulic actuator, which engages and disengages the friction engagement part. The hydraulic control apparatus is mounted with two or more hydraulic control valves for controlling the engagement hydraulic pressure of each hydraulic actuator.

As an example of a hydraulic control valve, the present embodiment shows the solenoid operated hydraulic control valve, which is a combination of a pressure regulating valve 1 (equivalent to a spool valve), and a solenoid 2.

The solenoid operated hydraulic control valve is described below. It should be noted that the solenoid operated hydraulic control valve shown in the first embodiment is a normally low (N/L) type, in which the output oil pressure declines or the output is stopped at the time of deenergization. It is noted that the NL type can be referred as, for example, a positive logic type or as a normally close type.

The pressure regulating valve 1 includes a valve housing 11, a spool 12, and a return spring 13. The valve housing 11 may typically be a cylindrical sleeve, or may be a circuit housing, either of which forms an oil pressure circuit. The spool 12 switches oil pressure ports. Also, the return spring 13 biases the spool 12 in a valve closing direction (rightward in FIG. 1).

The solenoid 2 applies an axial force to the spool 12 in the valve opening direction in accordance with a driving current or an amount of energization supplied from an electronic control unit (AT-ECU), which is not illustrated.

The valve housing 11 is described below. The valve housing 11 may be a circuit housing that forms the oil pressure circuit, or may be a sleeve that has a cylindrical shape received in a circuit housing. In the present embodiment, the valve housing 11 is an example of the circuit housing type. However, the valve housing 11 may be formed as an independent sleeve received in a circuit housing.

The valve housing 11 is provided with a shaft bore 14, an input port 15, an output port 16, and a discharge port 17. The shaft bore 14 slidably supports the spool 12 in the longitudinal direction, that is, along a longitudinal axis of the spool 12). The input port 15 is communicated with an oil pump (oil pressure generating means, which is not illustrated) via an oilway and the like, and is supplied with an input oil pressure (input oil). The output port 16 is communicated with a friction engaging device (specifically, hydraulic servo chamber of the hydraulic actuator) via an oilway. The discharge port 17 is communicated with a low pressure side.

The oil ports, such as the input port 15, the output port 16, and the discharge port 17, are formed in the side face of the shaft bore 14. The drain port 18, the input port 15, the output port 16, the discharge port 17, and a drain port 19 are formed in the side face of the shaft bore 14 from a left-hand side to a right-hand side in FIG. 1.

The spool 12 is described below. The spool 12 is arranged within the shaft bore 14 slidably in the longitudinal direction, and has an input sealing land 21, which seals the input port 15, and a discharge sealing land 22, which seals the discharge port 17. An output chamber 23 (distribution chamber) is provided between the input sealing land 21 and the discharge sealing land 22, and is in fixed communication with the output port 16.

Also, the spool 12 includes a feed back (F/B) land 24 having a smaller diameter than that of the input sealing land 21 on a left-hand side of the input sealing land 21 in FIG. 1. Therefore, an F/B chamber 25 is provided between the input sealing land 21 and the F/B land 24.

Inside the spool 12, an F/B port 26, which is communicated with the output chamber 23 and the F/B chamber 25, is formed. The F/B port 26 generates an F/B oil pressure to the spool 12 in accordance with an output pressure. Typically, an F/B orifice is provided in the middle of the F/B port 26 such that a suitable F/B oil pressure is generated in the F/B chamber 25.

An oil pressure (output pressure) applied to the F/B chamber 25 becomes larger in accordance with a rise in the output pressure thereof. An F/B valve-closing force (force in the valve closing direction) becomes larger to the spool 12 as a differential pressure resulting from a land difference between the input sealing land 21 and the F/B land 24 becomes larger. Typically, the land difference is a difference between effective areas of the lands 21, 24, to which pressure is applied. Due to the above described operation, displacement of the spool 12 is stabilized at the time of generating of the output pressure, and the output pressure is limited from fluctuating due to changes or fluctuations of the input pressure.

The return spring 13 is described below. The return spring 13 is a coil spring that gives a spring valve-closing force (force in the valve closing direction) to the spool 12, and has a cylindrical spiral shape. Also, the return spring 13 is arranged in a state, where the return spring 13 is compressed within a spring chamber 27 on the left-hand side of the shaft bore 14 in FIG. 1. The return spring 13 has one end that contacts a base of an adjusting screw 28, which blocks a left end of the shaft bore 14 in FIG. 1. Also, the return spring 13 has the other end that contacts an end of the spool 12. Therefore, the spring valve-closing force can be adjusted in accordance with an amount of threading of the adjusting screw 28, for example, relative to the valve housing 11.

It is noted that the spool 12 can stand still in a position, where the spring valve-closing force by the return spring 13, the F/B valve-closing force produced by the pressure in the F/B chamber 25, and the drive valve opening force by the solenoid 2 balance with each other.

The solenoid 2 is described below. The solenoid 2 is driving means for directly driving the spool 12 by a magnetomotive force in accordance with the amount of energization. The force displaces the spool 12 in a valve opening direction (e.g., an opposite direction opposite the valve closing direction). Typically, the solenoid 2 contains a coil, a fixed magnetic circuit, such as a stator, and a yoke, and a plunger, which is a moving core. The coil generates the magnetomotive force when energized. The fixed magnetic circuit forms a magnetic flux loop of the coil. The plunger gives a displacement force for displacing the spool 12 by magnetic force in the valve opening direction.

The solenoid 2 is controlled by an electronic control unit, which is not illustrated. The electronic control unit controls a driving current given to the solenoid 2 in accordance with the controlled duty cycle. The electronic control unit controls the driving current given to the solenoid 2 such that the electronic control unit gives the spool 12 the drive valve opening force, which works against the spring valve-closing force of the return spring 13 and against the F/B valve-closing force by the F/B chamber 25. Due to the above described operation, the spool 12 is displaced in the longitudinal direction such that the output oil pressure at the output port 16 is controlled.

An operation of the solenoid operated hydraulic control valve is described below. At the time of engaging the clutch of the friction engaging device, the driving current applied to the solenoid 2 from the electronic control unit increases in accordance with the controlled duty cycle (i.e., with a duty cycle control signal), and the spool 12 is displaced in the valve opening direction. As a stroke amount of the spool 12 in the valve opening direction becomes larger, a longitudinal input seal length of the input sealing land 21, which blocks the input port 15, becomes shorter. At the same time, a longitudinal discharge seal length of the discharge sealing land 22, which blocks the discharge port 17 becomes longer. As a result, the output oil pressure in the output port 16 increases, and the clutch of the friction engaging device (specifically, friction engagement part) is engaged.

At the time when the engagement of the clutch of the friction engaging device is completed, the electronic control unit sharply increases the driving current given to solenoid 2 such that a displacement speed of the spool 12 is increased. The increase in speed raises the output oil pressure in the output port 16, and strengthens the engagement of the clutch of the friction engaging device, the engagement of which has been completed.

In accordance with an operation contrary to the above described operation, the clutch of the friction engaging device can be disengaged.

The feature of the first embodiment is described below. As in the description provided above, the driving current given to the solenoid 2 is controlled using the duty cycle control. Also, fine vibration (dither), which is generated due to a duty frequency (driving frequency of, for example, 250-300 Hz), may occur to the spool 12 driven by the solenoid 2.

When the substantial fine vibration is generated in the spool 12, the output oil pressure is fluctuated due to the dithering in the duty frequency, hindering a smooth engagement of the clutch of the friction engaging device, such as in accordance with a conventional approach.

As previously described, the need for improving the responsiveness of switching of an automatic transmission have recently increased.

In a case, where the output of the solenoid 2 is enlarged in order to improve the change response, the fine vibration of the spool 12 resulting from the duty frequency will also become larger.

Thus, the solenoid operated hydraulic control valve of the first embodiment is provided with spring chamber damper means A and radial damper means B as means for limiting the fine vibration of the spool 12 resulting from the fluctuation or dithering of the duty frequency. Also, at the same time, in the solenoid operated hydraulic control valve, the output of the solenoid 2 is increased in order to improve the change response.

Figure 7A:
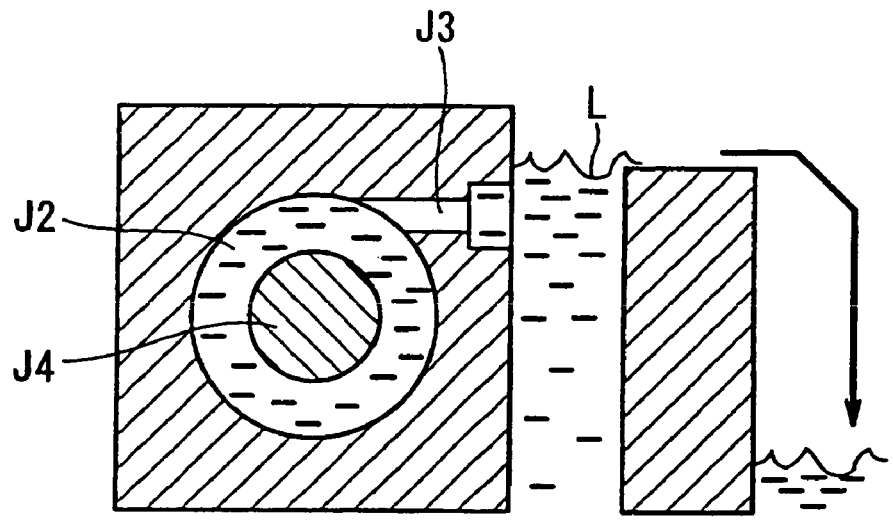
FIGS. 7A and 7B are diagrams each illustrating a relation between a spring chamber and an oil level position according to the related art.
Figure 7B:
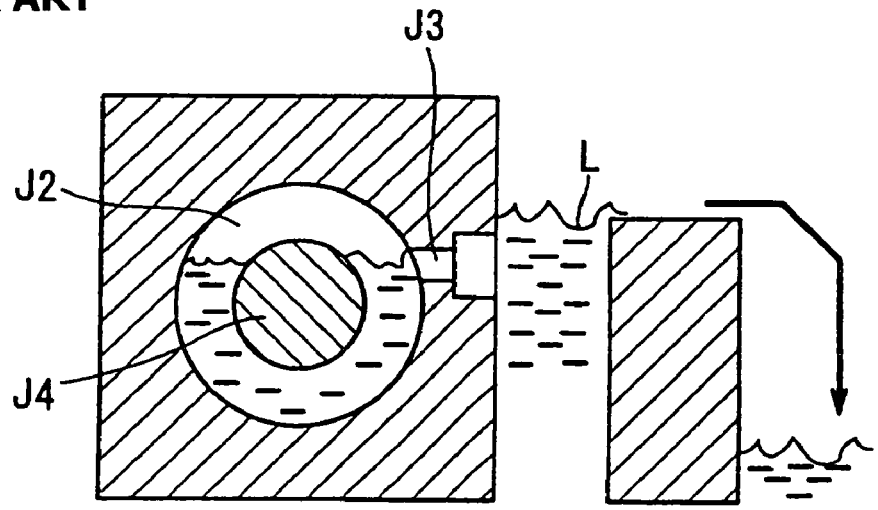

The pressure regulating valve 1 of the first embodiment shows an example, in which the spring chamber 27 is fully filled with oil correspondingly to a state of the related art as shown, for example, in FIG. 7A.

The spring chamber damper means A is an existing damper means, in which the spring chamber 27 is used as a damper chamber. The spring chamber damper means A includes the spring chamber 27 and an orifice spring chamber restrictor 31. The return spring 13 is arranged in the spring chamber 27, the volumetric capacity of which changes according to the displacement of the spool 12. The spring chamber restrictor 31 is formed in the drain port 18 (an example of an external communication passage), which is communicated with the spring chamber 27 and with the exterior, such as the exterior low pressure side. The spring chamber restrictor 31 restricts a passage area of the drain port 18.

The spring chamber restrictor 31 restricts the passage area of the drain port 18 such that a flow velocity of respiratory oil (e.g., oil that enters into and out of the spring chamber restrictor 31) due to the volume change of the spring chamber 27 is decreased. Thus, the spring chamber restrictor 31 reduces a speed of the volume change of the spring chamber 27, and for reducing the speed of displacing the spool 12.

The radial damper means B includes a radial damper chamber 32 and a radial chamber restrictor 33.

The radial damper chamber 32 is defined by a first diameter portion and a second diameter portion adjacently provided and different from each other in diameter. Here, the first diameter portion and the second diameter portion are formed in the spool 12. The radial chamber restrictor 33 provides communication between the spring chamber 27 (adjacent chamber) and the radial damper chamber 32. Here, the spring chamber 27 is provided adjacent to the radial damper chamber 32 in the longitudinal direction (e.g., a direction along a longitudinal axis of the spool 12). The first diameter portion of the spool 12 in the first embodiment is a shaft end portion 34 formed in a receiving side of the spool 12 for receiving the return spring 13 (e.g., a left-hand side of the spool 12 in FIG. 1). The second diameter portion of the spool 12 in the first embodiment is the F/B land 24, which is provided adjacent to the shaft end portion 34. An outer diameter of the shaft end portion 34 is smaller than an outer diameter of the F/B land 24.

That is, the spool 12 is a existing spool, and is not machined through a particular process.

A damper partition 35 defines the radial damper chamber 32, and is formed in the valve housing 11. The damper partition 35 is a small diameter portion provided in the valve housing 11, and faces an outer periphery of the shaft end portion 34 via a minute clearance. Thus, the radial damper chamber 32 is formed in a space between the F/B land 24 and the damper partition 35 in the longitudinal direction.

The radial chamber restrictor 33 restricts the area of the passage, which provides communication between the spring chamber 27 and the radial damper chamber 32 to decrease the flow velocity of the respiratory oil due to the volume change of the radial damper chamber 32. Thus, the radial chamber restrictor 33 reduces the speed of the volume change of the radial damper chamber 32, and reduces the speed of the displacement of the spool 12.

The minute clearance between the shaft end portion 34 and the damper partition 35 serves as, for example, the radial chamber restrictor 33 of the first embodiment. As above, the clearance between the shaft end portion 34 and the damper partition 35 is used as the radial chamber restrictor 33. Therefore, a special process (e.g., a machining process) for forming the radial chamber restrictor 33 is unnecessary, and the cost of the radial damper means B can be kept low.

Advantages of the first embodiment are described below. The solenoid operated hydraulic control valve of the first embodiment is further provided with the radial damper means B that limits (damps) the vibration of the spool 12 in addition to the spring chamber damper means A, which also limits the vibration of the spool 12 as described above.

For the above noted reason, a damping effect of the fine vibration of the spool 12 resulting from the duty frequency can be improved compared with the conventional art.

Therefore, even in a case, where the output of the solenoid 2 is increased in order to improve the change response of the automatic transmission, the fine vibration of the spool 12 resulting from fluctuation or dithering of the duty frequency can be limited from occurring, and the change of the output oil pressure can also be limited.

Even when the response speed of the solenoid operated hydraulic control valve, which directly drives the pressure regulating valve 1 by the solenoid 2, is increased, the change of the output oil pressure resulting from the duty frequency can be limited. Therefore, the engagement of the clutch of the automatic transmission can be performed smoothly and reliably.

In the first embodiment, the radial damper means B, which is additional damper means, can be provided only by providing the damper partition 35 in the existing solenoid operated hydraulic control valve. Therefore, cost for employing the radial damper means B can be kept very low. In other words, the cost of a solenoid operated hydraulic control valve with a high damping performance can be kept low.

Second Embodiment

Figure 2:
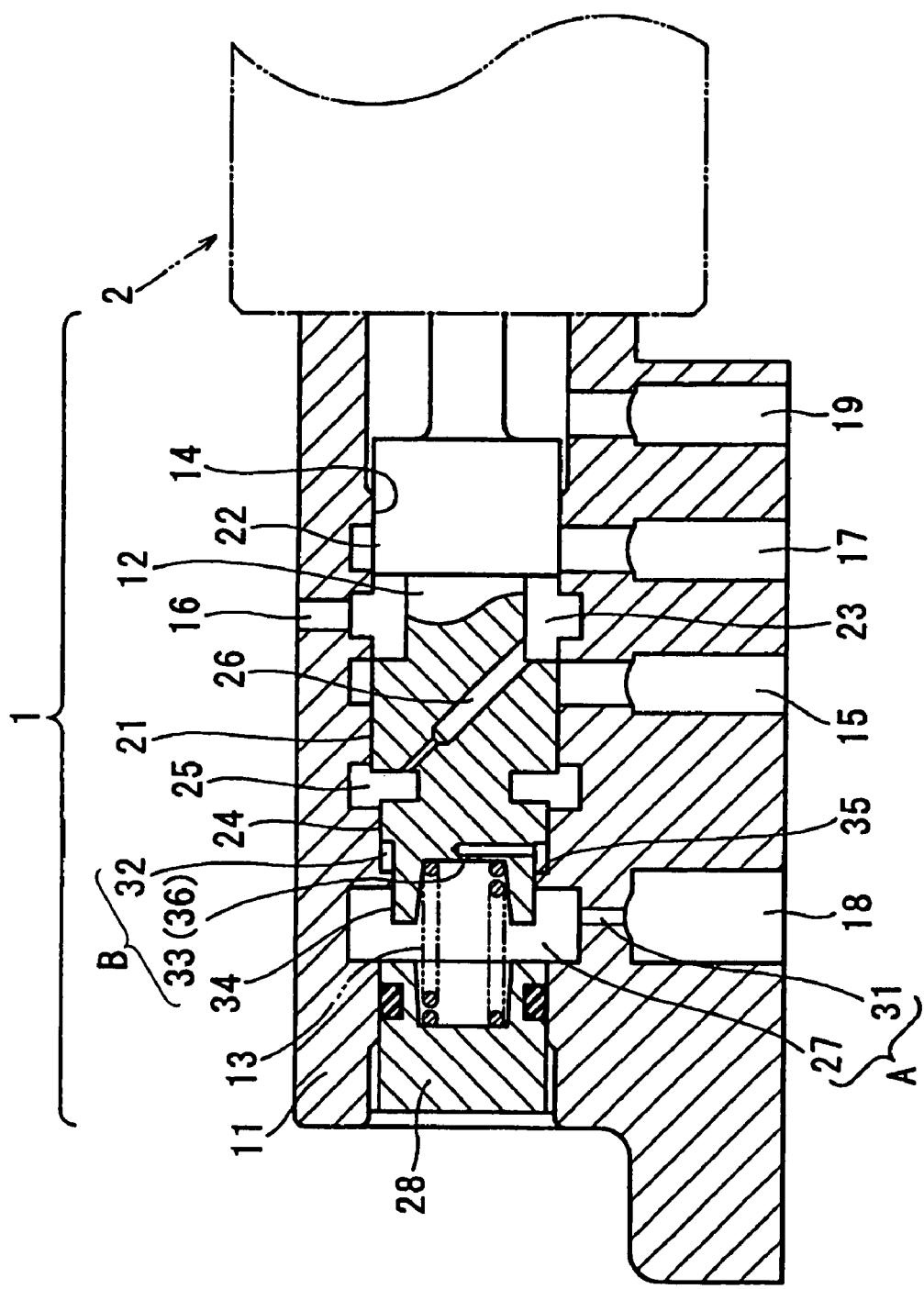
FIG. 2 is a diagram illustrating a sectional view of a solenoid operated hydraulic control valve according to a second embodiment.

The second embodiment is explained with reference to FIG. 2 and FIG. 3. Similar components in the following embodiment are similar in function to the components in the first embodiment, and are indicated by the same numerals.

The first feature of the second embodiment is described below. The above first embodiment shows an example using the minute clearance between the shaft end portion 34 and the damper partition 35 as the radial chamber restrictor 33.

In contrast, in the second embodiment, a minute clearance between the shaft end portion 34 and the damper partition 35 is made smaller than that of the first embodiment. Also, a through hole 36 is formed in the spool 12 to be provided with the radial chamber restrictor 33 as shown in FIG. 2. Specifically, the spool 12 of the second embodiment is provided with the through hole 36 to provide communication between the radial damper chamber 32 and the spring chamber 27. Also, the orifice or radial chamber restrictor 33 restricts a passage area, and is formed on part or the entire length of the through hole 36. Thus, even in a case, where the radial chamber restrictor 33 by the through hole 36 is formed in an inside of the spool 12, the same advantages as the first embodiment can be attained.

The above first embodiment shows an example where the inside of the spring chamber 27 is fully fulfilled with oil.

Figure 3:
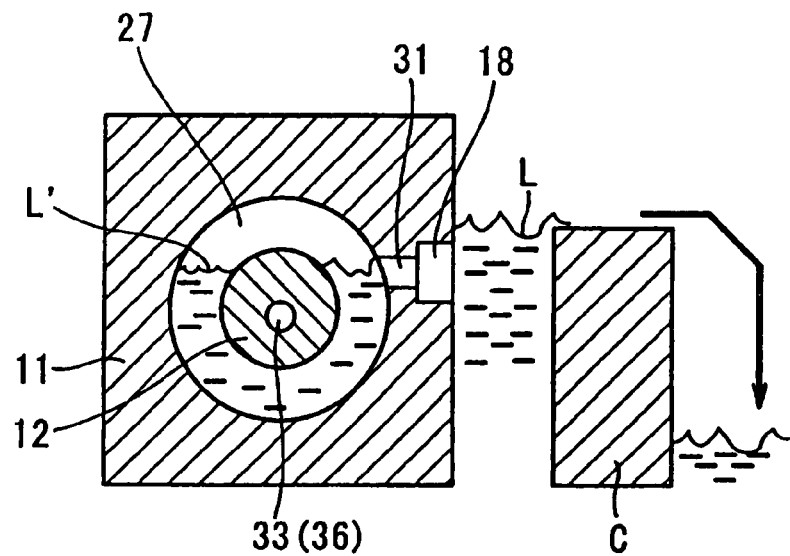
FIG. 3 is a diagram illustrating an explanatory view showing a relation between a spring chamber and an oil level position according to the second embodiment.

In contrast, in accordance with a second feature of the second embodiment, for example, as shown in FIG. 3, the oil level L of the exterior or low pressure side is below the upper end of the spring chamber 27 due to the oil way layout. In other words the oil level L is positioned toward the ground relative to the upper end of the spring chamber 27 when the solenoid operated hydraulic control valve is mounted in the vehicle. For example, in one layout, the valve housing 11 is mounted to an exterior of the automatic transmission case C. Also, in the second embodiment, the drain port 18 (spring chamber restrictor) may be positioned slightly below the upper end of the spring chamber 27.

In such a case, an air pocket, where air entering at the time of assembly is captured, may be formed in portion of the spring chamber 27, the portion located higher in elevation than, or above the spring chamber restrictor 31. Therefore, the performance of the spring chamber damper means A may deteriorate by air compression in the spring chamber 27 in accordance with the conventional art.

However, in the second embodiment, in a case or structure, where there is a possibility that air may enter into the spring chamber 27, the radial chamber restrictor 33 is formed lower in elevation than an assumed oil-level L' within the spring chamber 27. In other words, the radial chamber restrictor 33 is provided on a side of the assumed oil-level L' within the spring chamber 27 toward the ground when mounted. Specifically, an opening of the through hole 36 on the side toward the spring chamber 27 is disposed lower than (below) the oil level L' in the spring chamber 27 (e.g., the opening of the through hole 36 may be aligned with an axis of the spool 12).

Thus, the radial chamber restrictor 33 reliably serves as a damper orifice when the radial chamber restrictor 33 is provided lower in elevation than the oil level L'. That is, the radial chamber restrictor 33 is disposed below a certain level L' in the spring chamber (adjacent chamber) 27. Therefore, the fine vibration of the spool 12 can be reliably damped by the radial damper means B.

In the second embodiment, the through hole 36 is formed in the spool 12, and the radial chamber restrictor 33 is formed in the through hole 36. However, alternatively, the radial chamber restrictor 33, which includes a groove extended in the longitudinal direction, may be formed on an outer peripheral face of the shaft end portion 34. In the present case, in order to limit the groove (radial chamber restrictor 33) from rotating to a position at the upper side of the spool 12, a rotation limiting assembly (e.g., a notch) is provided to the spool 12.

Alternatively, the radial chamber restrictor 33, which includes a groove extended in the longitudinal direction, may be formed at an inner peripheral face of the damper partition 35.

The second embodiment shows an example, in which the radial chamber restrictor 33 is formed below the oil-level L' in the spring chamber 27. However, the radial damper chamber 32 is formed only at a vicinity of the lower part of the spring chamber 27 to limit the formation of the air pocket in the radial damper chamber 32. That is, the radial damper chamber 32 is disposed below a certain level L' in the spring chamber (adjacent chamber) 27. Thus, the radial damper means B more reliably demonstrates the damping effect.

Third Embodiment

Figure 5:
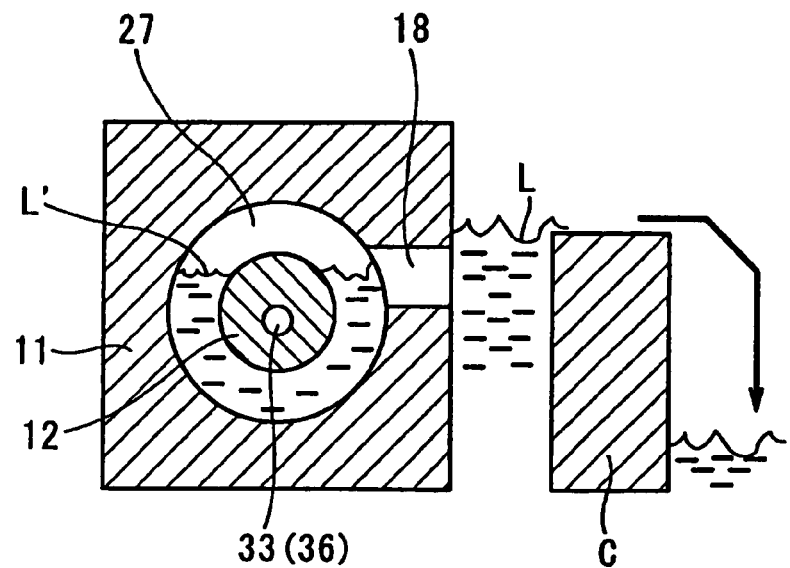
FIG. 5 is a diagram illustrating an explanatory view showing a relation between a spring chamber and an oil level according to the third embodiment.
Figure 4:
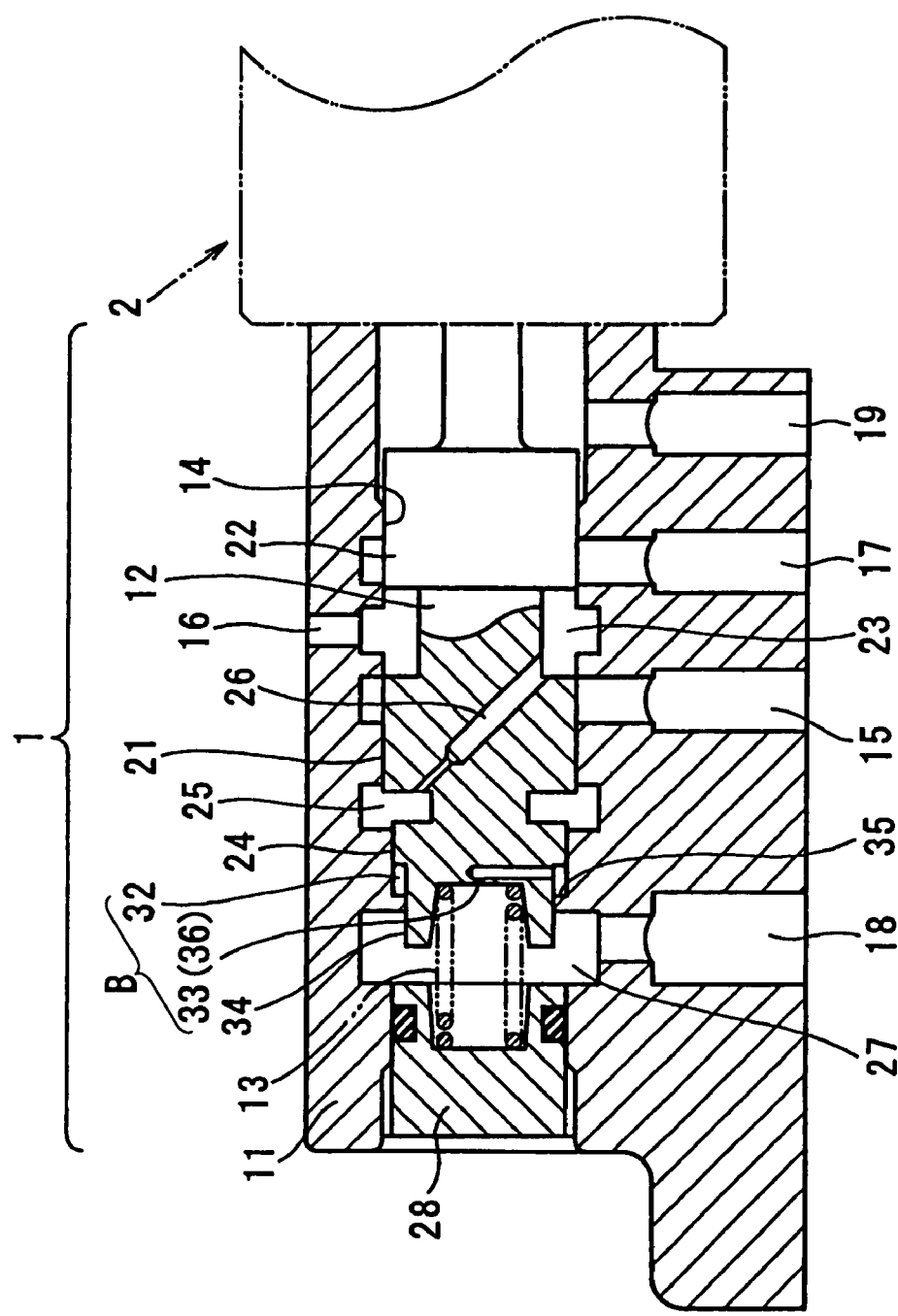
FIG. 4 is a diagram illustrating a sectional view of a solenoid operated hydraulic control valve according to a third embodiment.
Figure 6:
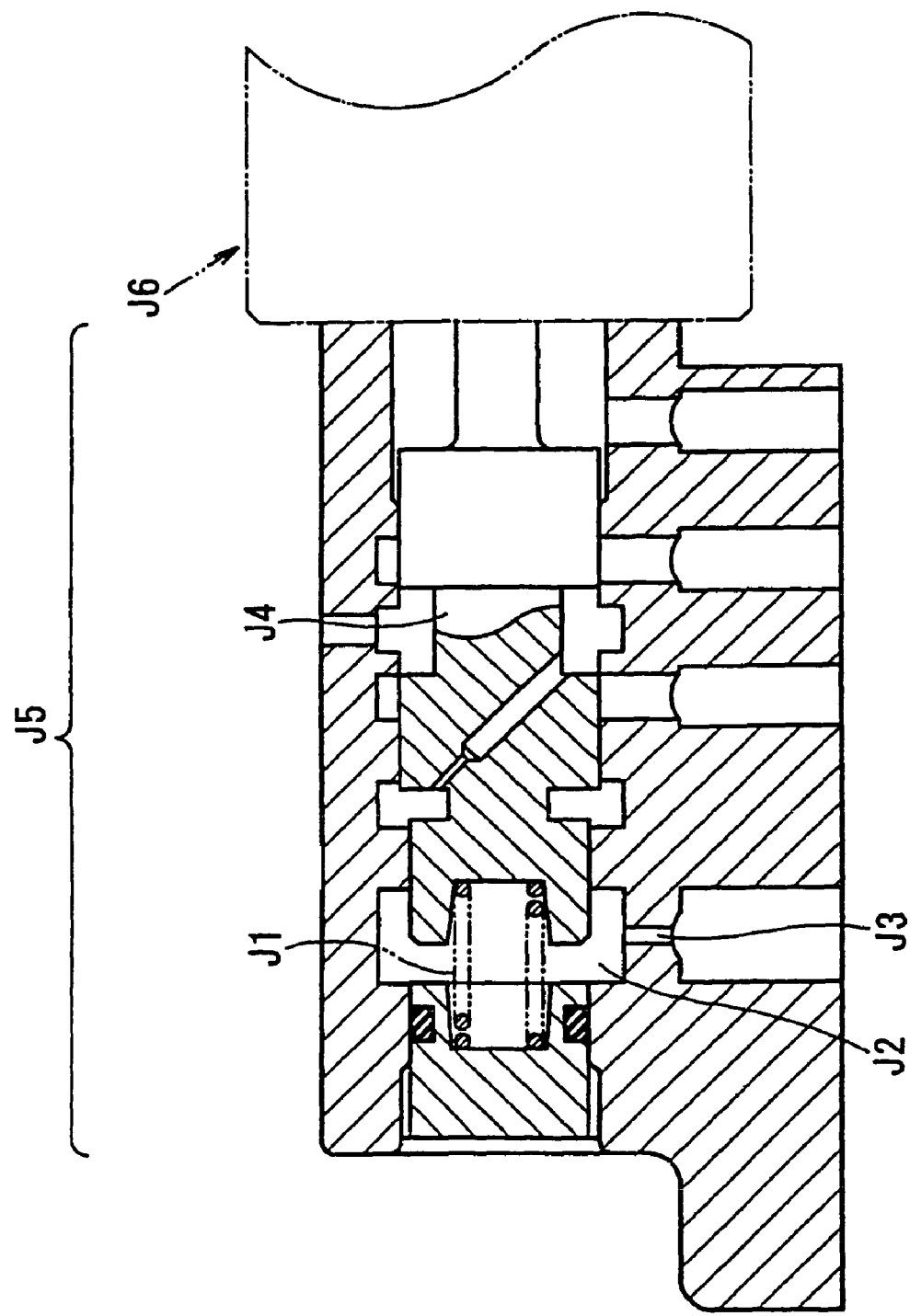
FIG. 6 is a diagram illustrating a sectional view of a solenoid operated hydraulic control valve according to a related art.

The third embodiment is explained with reference to FIG. 4 and FIG. 5. As shown in FIG. 5, in the third embodiment, in a case where the air pocket is formed in the spring chamber 27, the spring chamber restrictor 31 of the second embodiment (as shown in FIG. 3) is removed, and only the radial damper means B is provided.

In the case, where the air pocket is formed in the spring chamber 27, the spring chamber damper means A loses effectiveness due to the air compression in the spring chamber 27. Therefore, in accordance with the third embodiment, even in the case where only radial damper means B is provided, the advantages similar to those described in the second feature of the second embodiment can be attained.

Modification

The above embodiment shows an example in which the radial damper means B is provided to the pressure regulating valve 1 on a side thereof toward the spring-chamber 27. However, the radial damper means B may be alternatively provided to the pressure regulating valve 1 at a mid position in the longitudinal direction. Also, the radial damper means B may be alternatively provided to the pressure regulating valve 1 on an opposite side thereof opposite the spring-chamber 27. In other words, the radial damper means B may be provided to the pressure regulating valve 1 on a side thereof toward the solenoid 2.

Further, the above embodiment shows an example, in which the present invention is applied to the solenoid operated hydraulic control valve made in combination of the pressure regulating valve 1 and the solenoid 2. However, the radial damper means B may be mounted in the pressure regulating valve 1 driven by an output oil pressure of a pilot valve (e.g., electromagnet three-way valve). Of course, the present invention may be applied to a pilot valve.

In the above embodiment, the present invention is applied to the pressure regulating valve 1, which controls oil pressure. However, the present invention may be applied to an oil flow control valve, which controls an amount of the oil or other valves.

Also, the present invention may be applied to a spool valve, which controls a pressure or a flow amount of other fluid other than oil. The present invention may be applied to a spool valve that controls a pressure or a flow amount of gas, such as air.

In the above embodiment, the present invention is applied to the spool valve having a three-way valve structure. However, the present invention may be applied to a spool valve of other structures, such as a two-way valve (opening and closing valve) structure, a four-way valve structure, and the like.

The above embodiment shows an example using the solenoid 2 to provide the driving force to the spool 12. However, other electric actuators, such as a piezo actuator, a motor or the like, may be used, and a fluid pressure actuator may also be used.

In the above embodiment, the radial damper means includes at least one of the clearance 33 between the shaft end portion 34 and the damper partition 35, the through hole 36 that penetrates through part of the spool 12, the groove that is formed at the outer peripheral surface of one of the first and second diameter portions, and the groove that is formed at the inner peripheral surface of the shaft bore 14. However, the radial damper means may be formed by other component other than those described above.

The above embodiment shows an example of applying the present invention to a spool valve carried in an automatic transmission. However, the present invention may be applied to a spool valve of other devices other than the automatic transmission.

Additional advantages and modifications will readily occur to those skilled in the art. The invention in its broader terms is therefore not limited to the specific details, representative apparatus, and illustrative examples shown and described.

What is claimed is:

1. A spool valve comprising:
   a valve housing having a shaft bore, an output port, and a drain port communicated with an exterior;
   a spool that is slidably supported within the shaft bore in a longitudinal direction, the spool having a first diameter portion and a second diameter portion;
   an output chamber defined between the valve housing and the spool, wherein the output chamber is communicated with the output port;
   a feed back chamber defined between the valve housing and the spool;
   a feed back port defined within the spool for providing communication between the output chamber and the feed back chamber; and
   radial damper means having:
      a radial damper chamber defined by a diameter difference between the first diameter portion and the second diameter portion; and
      a radial chamber restrictor providing restricted communication between the radial damper chamber and an adjacent chamber disposed adjacent to the radial damper chamber in the longitudinal direction, wherein
   the adjacent chamber serves as a spring chamber, in which a spring is provided for biasing the spool in the longitudinal direction; and
   the spring chamber is communicated with the drain port.

2. The spool valve according to claim 1, further comprising spring chamber damper means including:
   the spring chamber having a volume changeable in accordance with a displacement of the spool; and
   a spring chamber restrictor disposed in the drain port that provides communication between the spring chamber and the exterior.

3. The spool valve according to claim 1, wherein:
   the spool valve includes a liquid adjusting valve that adjusts one of a pressure and an amount of liquid; and
   one of the radial chamber restrictor and the radial damper chamber is disposed below a liquid level in the adjacent chamber.

4. The spool valve according to claim 1, wherein the spool is directly operated by a solenoid driven in accordance with to a duty cycle control signal.

5. The spool valve according to claim 1, wherein the spool valve is mounted on a hydraulic control apparatus of an automatic transmission for controlling an engagement oil pressure the automatic transmission.

6. The spool valve according to claim 1, wherein the radial damper chamber is disposed only below a certain level in the adjacent chamber.

7. The spool valve according to claim 1, wherein the radial chamber restrictor is disposed below a certain level in the adjacent chamber.

8. The spool valve according to claim 1, wherein the radial chamber restrictor providing restricted communication between the radial damper chamber and a spring chamber includes at least one of:
  a clearance between the spool and a damper partition projecting from an inner peripheral surface of the shaft bore toward the spool and a through hole that penetrates through part of the spool.

9. The spool valve according to claim 1, wherein the radial chamber restrictor includes at least one of a clearance between the spool and a damper partition projecting from an inner peripheral surface of the shaft bore and a through hole that penetrates through part of the spool.

* * * * *